(12) United States Patent
Lazar et al.

(10) Patent No.: US 7,412,882 B2
(45) Date of Patent: Aug. 19, 2008

(54) METER WITH INTEGRAL REGISTER HAVING NO VISUAL DISPLAY OF CONSUMPTION

(75) Inventors: Mark Lazar, New Berlin, WI (US); Ronald D. Benson, Colgate, WI (US); Eric Metzger, Milwaukee, WI (US); Kelly Laughlin-Parker, Waukesha, WI (US); Joseph Stauber, Sheboygan Falls, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 11/353,773

(22) Filed: Feb. 14, 2006

(65) Prior Publication Data

US 2007/0186644 A1    Aug. 16, 2007

(51) Int. Cl.
*G01F 15/14* (2006.01)
(52) U.S. Cl. .......................................................... 73/273
(58) Field of Classification Search ........................ None
See application file for complete search history.

(56) References Cited

U.S. PATENT DOCUMENTS

| | | | | |
|---|---|---|---|---|
| 2,354,563 A | * | 7/1944 | Weisse ....................... 73/272 R |
| 3,027,586 A | * | 4/1962 | Hirsch .................... 15/250.001 |
| 3,555,902 A | | 1/1971 | Onoda et al. |
| 3,564,919 A | * | 2/1971 | Varga ........................... 73/258 |
| 3,653,261 A | | 4/1972 | Feldman |
| 3,731,534 A | * | 5/1973 | Painley et al. .................. 73/273 |
| 3,772,917 A | * | 11/1973 | Lutz et al. ................. 73/861.78 |
| 3,835,706 A | * | 9/1974 | Varga ........................... 73/254 |
| RE28,640 E | | 12/1975 | Sauriol |
| 3,994,168 A | * | 11/1976 | Varga ........................... 73/258 |
| 4,253,341 A | * | 3/1981 | Ikeda et al. ............... 73/861.77 |
| 4,306,457 A | * | 12/1981 | Fukui et al. ............... 73/861.77 |
| 4,422,325 A | * | 12/1983 | Sutherland et al. ............ 73/273 |
| 4,553,433 A | | 11/1985 | Hicks |
| 4,804,957 A | * | 2/1989 | Selph et al. ............ 340/870.03 |
| 5,261,275 A | * | 11/1993 | Davis ........................... 73/258 |
| 5,298,894 A | | 3/1994 | Cerny et al. |

(Continued)

FOREIGN PATENT DOCUMENTS

GB    2 222 898 A    3/1990

(Continued)

OTHER PUBLICATIONS

American Water Works Association, Encoder-Type Remote-Registration Systems for Cold-Water Meters, May 1, 2005, pp. vii-xii.

(Continued)

*Primary Examiner*—Harshad Patel
(74) *Attorney, Agent, or Firm*—Boyle Fredrickson, S.C.

(57) ABSTRACT

A combined utility meter and meter register assembly (10) is disclosed in which a housing (11, 13, 31) for both a utility metering element and a meter register has no visual readout or display of metering data. Metering data is signaled through a data port (33) or an antenna (36) to external equipment. The meter register is provided by electronic circuitry (29*a*, 29*b*) that is placed in an upper cavity (27) in the housing part (13) that is then closed by a cover (31) or a body of sealing material. A label (32) can be placed over the closure informational purposes. An additional embodiment of the housing is also disclosed.

20 Claims, 5 Drawing Sheets

U.S. PATENT DOCUMENTS

| | | | |
|---|---|---|---|
| 5,339,686 A | | 8/1994 | DeJarlais et al. |
| 5,416,475 A | * | 5/1995 | Tolbert et al. .......... 340/870.02 |
| 5,438,329 A | * | 8/1995 | Gastouniotis et al. .. 340/870.02 |
| 5,659,300 A | * | 8/1997 | Dresselhuys et al. ..... 73/861.78 |
| 5,734,103 A | | 3/1998 | Walding, Jr. et al. |
| 5,986,574 A | * | 11/1999 | Colton .................. 340/870.02 |
| 6,079,263 A | * | 6/2000 | Beddies ........................ 73/197 |
| 6,246,677 B1 | | 6/2001 | Nap et al. |
| 6,304,231 B1 | * | 10/2001 | Reed et al. .................. 343/873 |
| 6,333,626 B1 | * | 12/2001 | Edwards ................. 73/861.77 |
| 6,588,447 B1 | * | 7/2003 | Hendey ................. 137/315.06 |
| 6,604,434 B1 | * | 8/2003 | Hamilton et al. ......... 73/861.75 |
| 6,611,769 B2 | | 8/2003 | Olson |
| 6,931,946 B1 | * | 8/2005 | Hendey ................... 73/861.79 |
| 7,143,645 B2 | | 12/2006 | Benson et al. |
| 2002/0063555 A1 | * | 5/2002 | Maddox ..................... 324/156 |
| 2002/0083778 A1 | | 7/2002 | Hamilton |
| 2006/0114121 A1 | * | 6/2006 | Cumeralto et al. ..... 340/870.02 |

OTHER PUBLICATIONS

American Water Works Association, Encoder-Type Remote-Registration Systems for Cold-Water Meters, pp. 1-8.
American Water Works Association, Direct-Reading, Remote-Registration Systems for Cold-Water Meters, Jun. 12, 2005, pp. v-ix.
American Water Works Association, Direct-Reading, Remote-Registration Systems for Cold-Water Meters, pp. 1-6.

* cited by examiner

METER WITH INTEGRAL REGISTER HAVING NO VISUAL DISPLAY OF CONSUMPTION

TECHNICAL FIELD

This invention relates to utility meters and in particular to utility meters of a type having a flow element disposed in a housing connected in a pipeline and a register for reading accumulated flow totals.

DESCRIPTION OF THE BACKGROUND ART

Utility meters have for many years been used a flow metering element, such as a turbine, paddle wheel or nutating disc, or other element which is disposed in a housing connected in a pipeline. The housing has often been a bronze casting, and in more recent years, other materials, including other alloys and including plastic, have been proposed and used for the housing. The meter housing typically has threaded inlet and outlet spouts which are fastened by nuts to ends of pipe in a supply pipeline.

The utility meter assembly has been completed by a meter register, which has had a mechanical gear arrangement driving an odometer-style set of number wheels disposed under a glass or crystal for visual observation of accumulated flow totals by a meter reading technician.

In recent years, remote read-out devices have been provided to relay the accumulated totals to the outside of a residence or building for easier access by a meter reading technician. Radio systems have also been introduced in which the quantities of consumption are signaled by RF signals from the meter to a data collection vehicle or to a fixed RF receiving station.

In view of these developments it is desired to provide a totally new approach to manufacture of a meter and meter register that will lower manufacturing costs while providing improved efficiency and functionality to providing and collecting meter data.

Hicks, U.S. Pat. No. 4,553,433, discloses a gas meter which is said to have an integral instrument housing. In fact, only the bottom portion of the register housing is integral and there is a large windowed cover (FIGS. 1 and 2) that snaps shut over the bottom portion to complete the register housing.

Feldman, U.S. Pat. No. 3,653,261, illustrates a utility meter which is provides some integration in assembly of its mechanical parts. There is a separate housing for the register. There is a port for reading out data to a remote display, and there is also a visual readout provided by dials in the register.

Painley et al., U.S. Pat. No. 3,731,534, shows a security plastic housing of having a body and dome parts 14, that are assembled around a meter and a register. The housing has a window to permit viewing of the register.

Sauriol, Reissued U.S. Pat. No. 28,640, provides a housing which is, in fact, a pit enclosure in which a meter/register assembly would be placed.

None of these references provide or suggest the solution which is the subject of the present invention.

SUMMARY OF THE INVENTION

The invention provides a combined utility meter and meter register assembly, comprising a housing for both a utility metering element and a meter register, in which there is no visual readout or display of metering data on the combined utility meter and meter register assembly.

An integrated meter/register unit with no visual read-out or visual display has not been known or suggested in the art.

In a further aspect of the invention, a data port or an antenna is provided in the housing for communicating metering data to external equipment.

The meter register is provided by electronic circuitry which is positioned in an upper cavity in a housing part and is closed by a cover or by sealing material. A label can be placed over the cover or sealing material for informational purposes.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
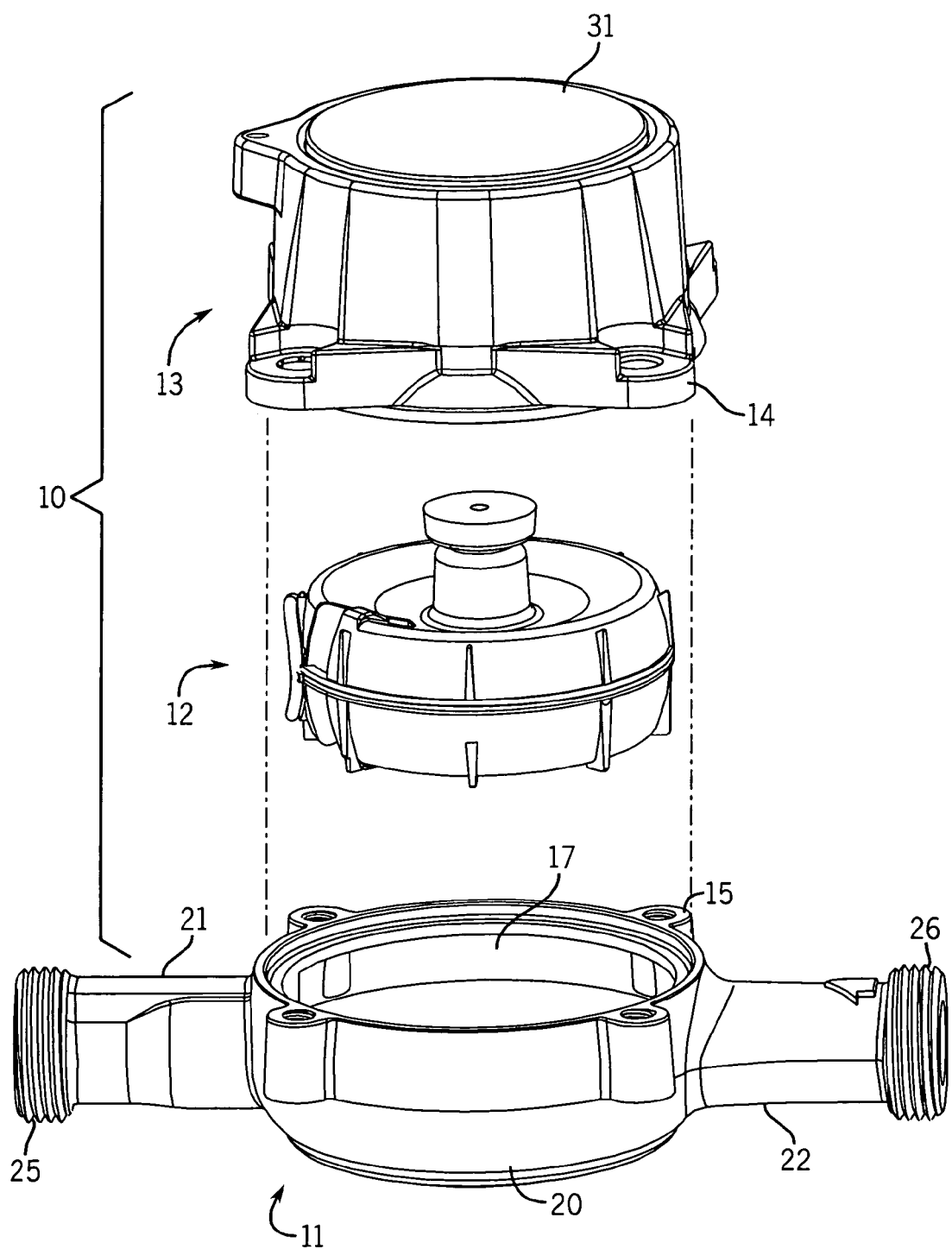
FIG. 1 is an exploded perspective side view of a first embodiment of the present invention.

Referring to FIG. 1, a utility meter and meter register assembly 10 is shown with a lower housing part 11, a disc metering assembly 12 and an upper housing part 13. The upper housing part 13 is mounted to the lower housing part 11 with fasteners, such as threaded screws 16 (FIG. 2), that pass through holed flanges 14 on the upper housing part 11 into bosses 15 on the lower housing part 11. The disc metering assembly 12 can be constructed as disclosed in co-pending application Ser. No. 10/831,817 or in U.S. Pat. No. 3,248,583, assigned to the assignee herein.

Figure 2:
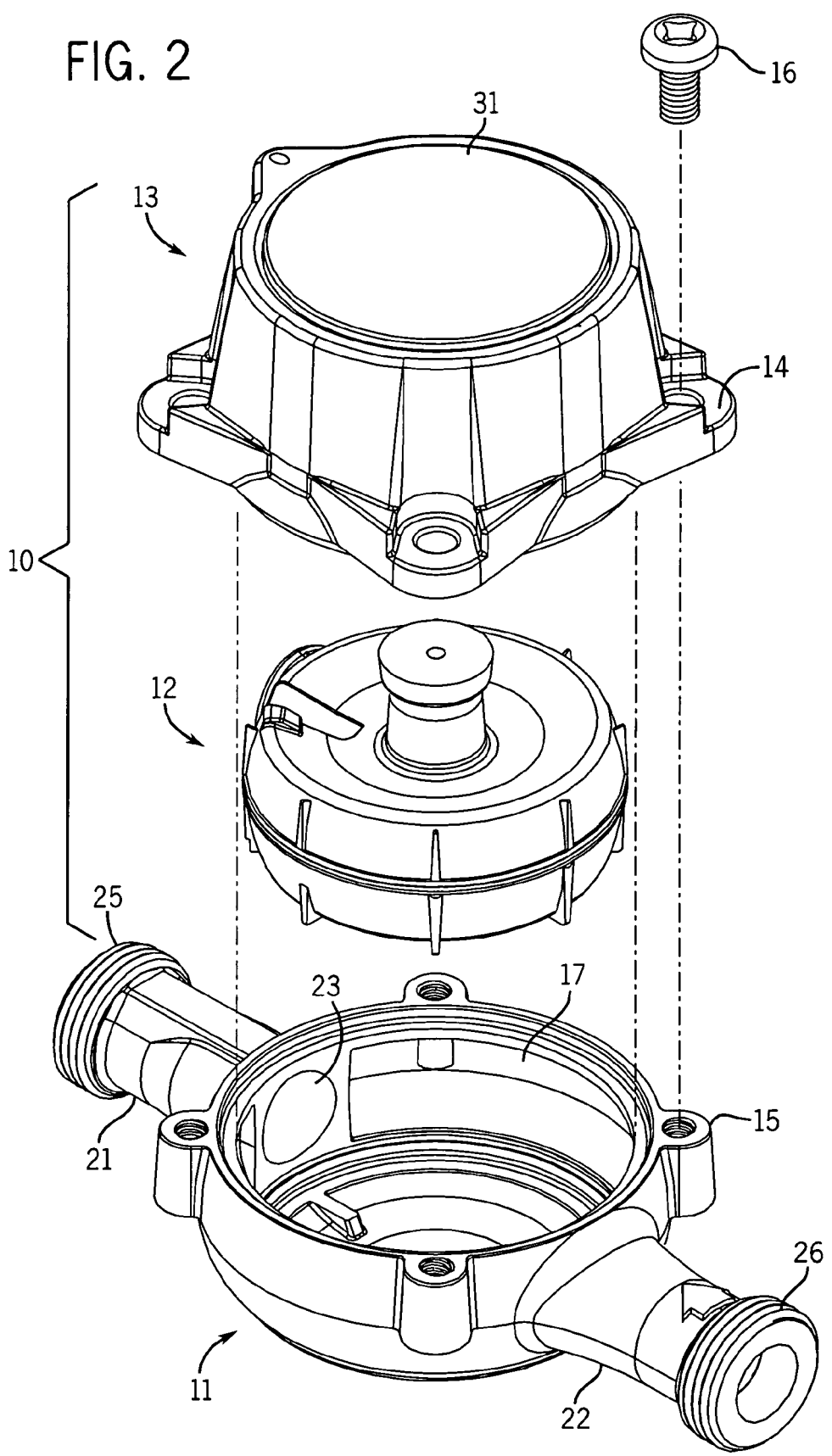
FIG. 2 is a second exploded perspective side view of a first embodiment of the present invention.

In FIGS. 1 and 2, the lower housing part 11 is formed of plastic, which is injection molded to provide the features shown in one piece. The lower housing 11 has a bowl portion 20 that forms a lower part of a metering chamber 17 for receiving a bottom of the disc metering assembly 12. Spouts 21 and 22 extend from exit and entrance flow ports on opposite sides of the bowl portion 20 with the exit port 23 being observed in FIG. 2. The free ends of the spouts 21 and 22 have threads 25, 26 formed thereon for engagement with coupling nuts (not shown) that connect the spouts 21 and 22 in a pipeline.

Figure 3:
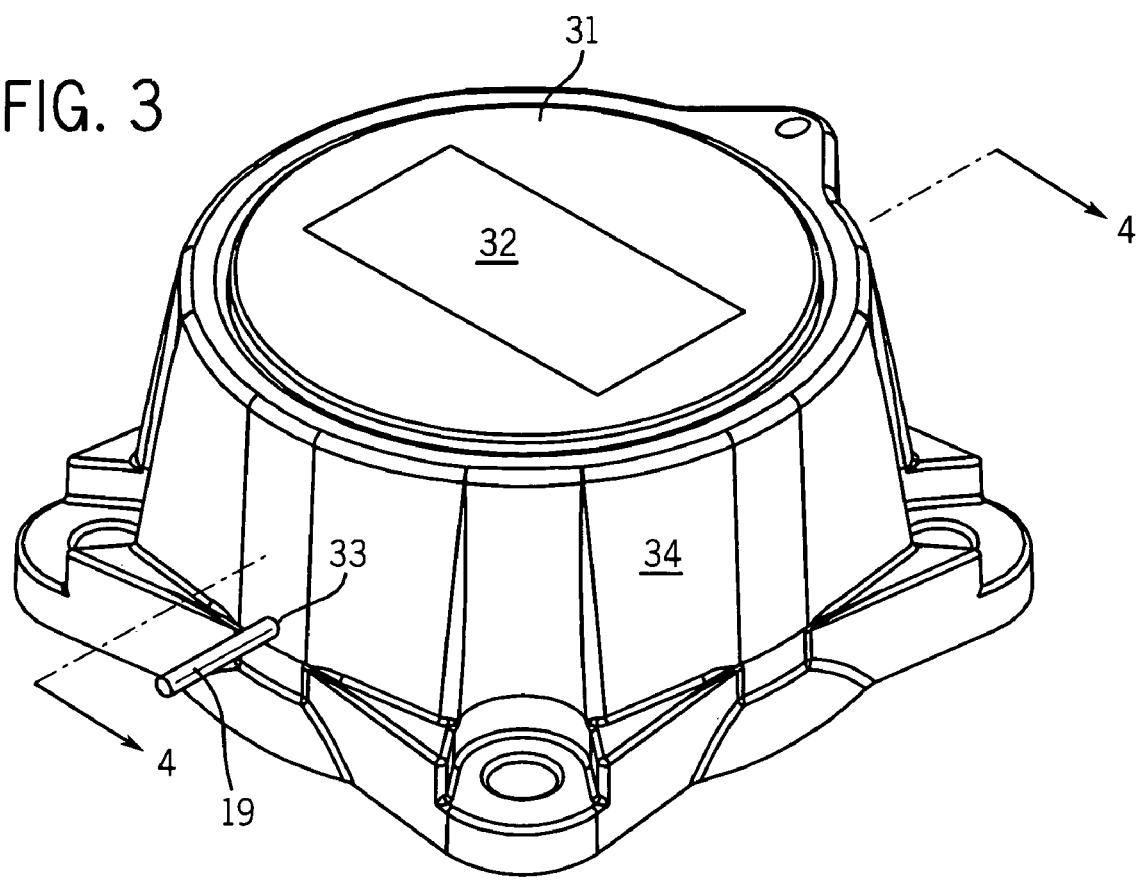
FIGS. 3 and 4 are perspective and sectional views of the upper part of the assembly in a first embodiment of the invention.
Figure 4:
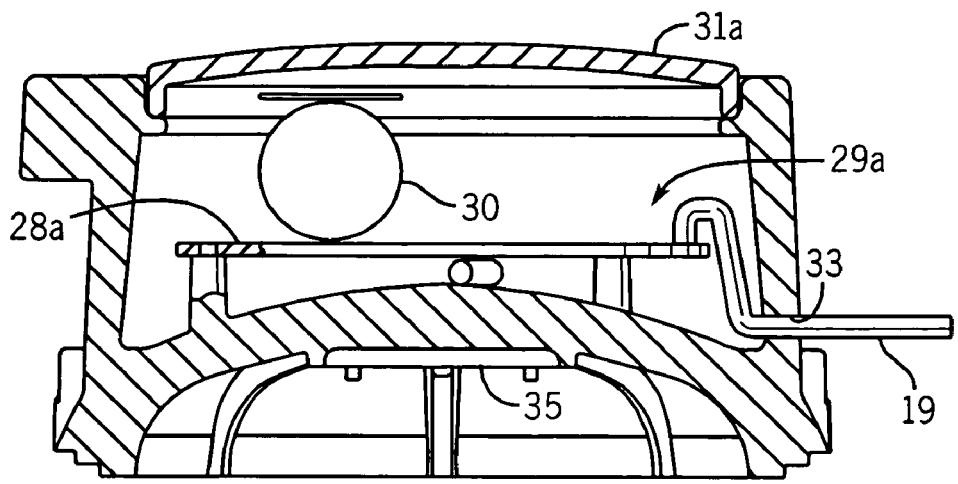
Figure 7:
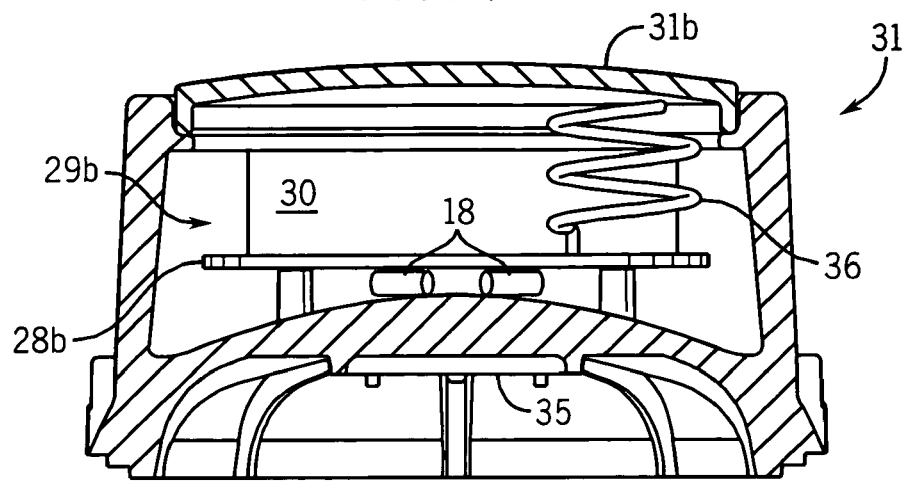

The upper housing part 13 forms a top of the metering chamber 17 for the disc metering assembly 12 and also forms a cavity 27 (FIG. 5) that opens to the top to receive electrical components for an electrical meter register. These components are typically mounted on a circuit board 28a, 28b in a circuit board assembly 29a, 29b, as seen in FIGS. 4 and 7, respectively, and would include a battery 30. These components would then be covered with a cover 31 or with a sealing material that would close a top opening into the cavity 27. This would form a generally flat or slightly curved upper surface on which a label 32 (FIG. 3) can be mounted with important identification information and notices.

Movements of the flow metering element are translated to rotations of a rotating disc 35 seen in FIGS. 4 and 7. The circuit board assemblies 29*a*, 29*b* have components 18 (FIG. 6) for detecting these rotational movements and circuitry for converting these movements to electrical signals.

As seen in FIG. 4, a data port 33 is situated in a sidewall 34 of the plastic housing part 13 through which a wire 19 passes to an external device such as a transmitter. This allows meter pulses or signals developed in the circuit board assembly 29*a* to be transmitted to a transmitter for further transmission to a computer or to a receiving station.

It can be seen that the resulting assembly provides a new type of integrated meter and meter register with no visual read-out or display, but only a data port 33 for transmitting meter consumption data. A label 32 may be place on the cover 31*a*. This has advantages of both economy and security. The assembly 10 is manufactured at lower cost than prior products and once installed in the field, is replaced rather than serviced in the field. There is also the possibility of reconditioning the assemblies at a service facility.

Figure 5:
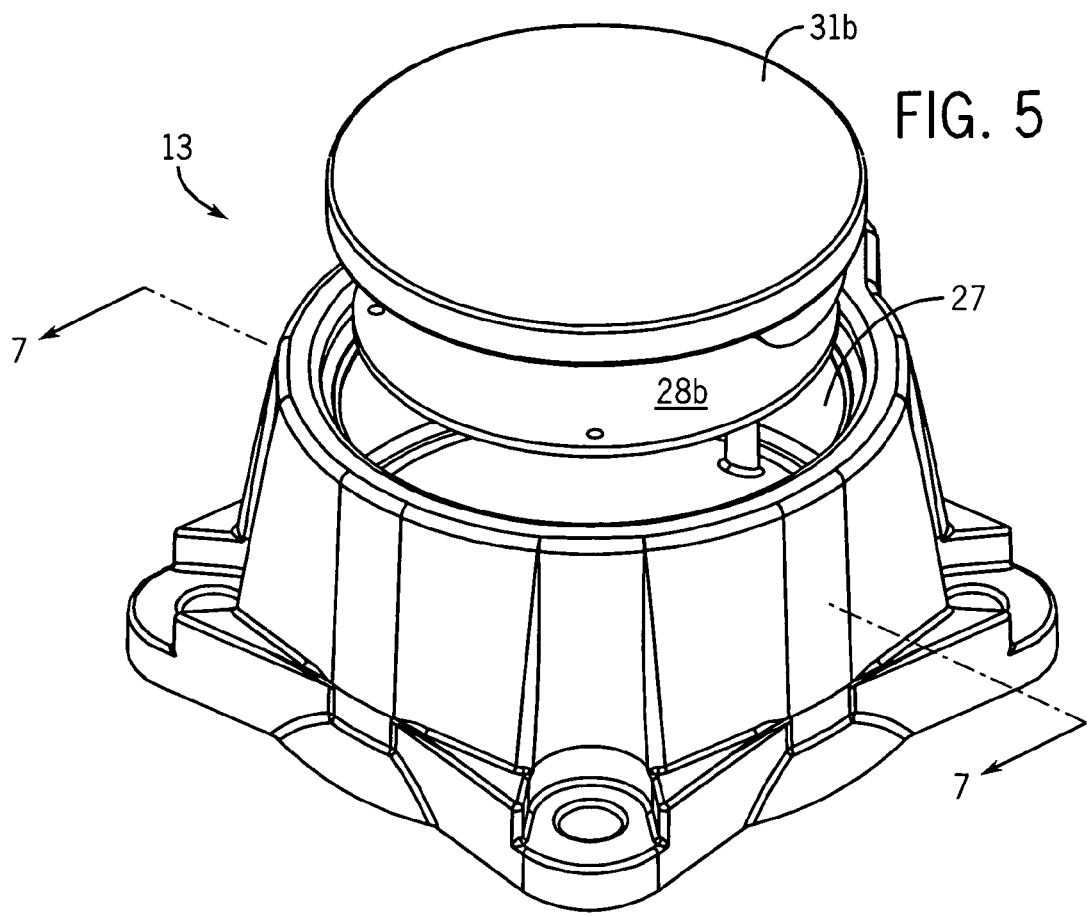
FIGS. 5, 6 and 7 are perspective, exploded and sectional views of the upper part of the assembly in a second embodiment of the invention.
Figure 6:
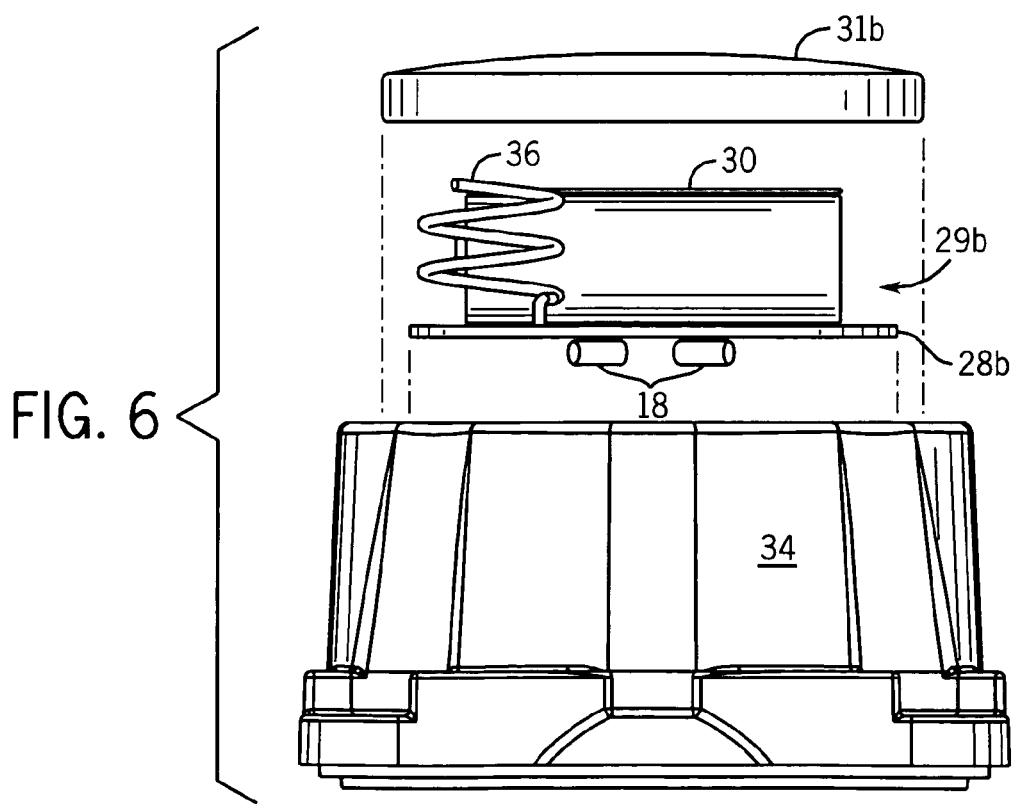

FIGS. 5-7 shows a second embodiment in which the circuit board assembly 29*b* includes (an antenna 36 for transmission of radio frequency metering signals. This circuit board assembly 29*b* is disposed in the upper cavity 27 in the upper housing part 13 of the assembly and is enclosed by a cover 31*b*. The circuit board assembly 29*b* has components 18 for detecting these rotational movements and converting them to radio frequency electrical signals, which are then transmitted through the antenna 36 to a receiving station located some distance from the meter assembly 10.

It can be seen that the resulting assembly provides a new type of integrated meter and meter register with no visual read-out or display, but only a transmitter and antenna for transmitting meter consumption data. This has advantages of both economy and security. The assembly 10 is manufactured at lower cost than prior products and once installed in the field, is replaced rather than serviced in the field. There is also the possibility of reconditioning the assemblies at a service facility.

Figure 8:
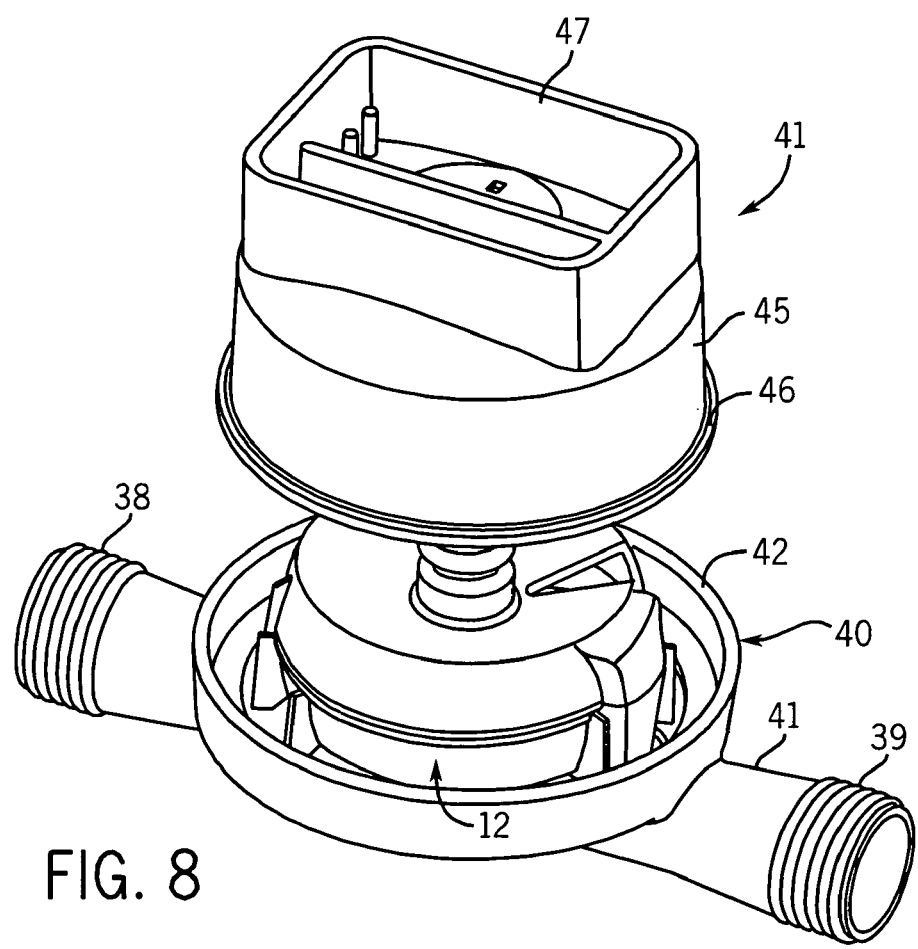
FIG. 8 is an exploded perspective view of an alternative embodiment of a housing for the present invention.

FIG. 8 shows an alternative embodiment of the housing having a lower part, as disclosed in co-pending U.S. patent application Ser. No. 10/831,990, which is formed as a hydroformed or stamped brass housing part 40. The housing part 40 can be made of copper or a copper alloy provided that it is essentially lead-free. The housing part 40 has a lip 42 that runs around a lower edge of a plastic body 45. The part 40 is held in place by a stamped and formed clamp (not shown) or by rolling the lip 42 over the bottom ridge 46 of the plastic housing body 45.

The body 45 is an integrally formed, cylindrical, plastic housing body, with a cylindrical bottom portion forming an upper part of the metering chamber and a rectangular upper portion forming a cavity 47 for parts forming an electronic meter register and pulse transmitter. The cavity 47 opens to the top to receive electrical components for an electrical meter register. These components are typically mounted on a circuit board (not shown) and would include a battery. These components would then be covered with a cover or with a sealing material that would cure and solidify to enclose the cavity. This material would form a generally flat or slightly curved upper surface on which a label can be mounted with important identification information and notices.

The spouts for the lower housing part 40 are provided by portions of hydroformable or stamped brass tubing 41. The tubing 41 can be made of copper or a copper alloy provided that it is essentially lead-free. The brass tubing 41 is also formed with an inlet exit and an outlet entry for reception in an inlet spout and outlet spout of the housing bottom. Two additional components are provided by a pair of threaded spud ends 38 and 39. The spud ends 38, 39 provide a threaded inlet and a threaded outlet for connection in a utility supply line (not shown). The spud ends 38, 39 are brazed on, welded to, or crimped on, the ends of the tubing 41 to provide sealed, watertight connections.

A data port can be provided in a sidewall of the plastic housing body for connection to a transmitter or transponder. This allows meter pulses or signals developed in the meter register to be transmitted to a computer or collection station. RF circuitry and an antenna can be place in the cavity and used to transmit the metering data as RF signals to external equipment.

It can be seen that the resulting assembly provides a new type of integrated meter and meter register with no visual readout, but only a data port or antenna for communicating meter consumption data. This has advantages in both economy or manufacture and security.

This has been a description of the preferred embodiments, but it will be apparent to those with skill in the art to which the invention pertains that various modifications may be made to these specific embodiments without departing from the spirit of the present invention, and that such modifications are intended to be encompassed by the following claims.

We claim:

1. A combined utility meter and meter register assembly, comprising:
    a housing for both a fluid flow metering element and a meter register device, the housing having a lower housing part for allowing a fluid to flow therethrough and an upper housing part for housing electrical components, the upper housing part providing a sealed cavity for containing the meter register device;
    the fluid flow metering element enclosed between the upper housing part and the lower housing part and the meter register device disposed in the sealed cavity of the upper housing part of the housing;
    wherein the meter register device includes a device that converts mechanical movement of the flow metering element to electrical signals, circuitry for converting the electrical signals to metering data signals, and a means for electronically communicating the metering data signals to an external device, and
    wherein there is no visual indicator of metering data included within the combined utility meter and meter register assembly.

2. The combined utility meter and meter register assembly of claim 1, wherein the upper housing part has a one-piece body that forms a first cavity opening upwardly to receive the meter register device and also forms a second cavity as a top portion of a chamber for housing the fluid flow metering element.

3. The combined utility meter and meter register assembly of claim 2, wherein the meter register device is disposed in the first cavity in the housing, wherein a body of sealing material is used to seal the first cavity and wherein an information label is placed over the sealing material in the first cavity.

4. The combined utility meter and meter register assembly of claim 3, wherein the means for communicating the metering data signals includes a data port for communicating metering data signals from the meter register device to an external transmitter.

5. The combined utility meter and meter register assembly of claim 1, wherein the lower housing part forms spouts for a fluid inlet and a fluid outlet, respectively, in a body having a one-piece construction.

6. The combined utility meter and meter register assembly of claim 1, wherein the housing further comprises a lower housing part that is made of plastic and an upper housing part that separates the chamber and the sealed cavity and is made of plastic.

7. The combined utility meter and meter register assembly of claim 6, wherein the lower housing part and the upper housing part are fastened together with threaded fasteners.

8. The combined utility meter and meter register assembly of claim 1, wherein the lower housing part is made of metal and the upper housing part is made of plastic.

9. The combined utility meter and meter register assembly of claim 8, wherein the upper housing part is fastened to the lower housing part by rolling an edge of the lower housing part over a lower lip on the upper housing part.

10. The combined utility meter and meter register assembly of claim 1, wherein the fluid flow metering element includes a nutating disc.

11. The combined utility meter and meter register assembly of claim 1, wherein the circuitry includes circuitry for producing radio frequency metering data signals and wherein the means for communicating the metering data signals to an external device includes an antenna for communicating the radio frequency metering data signals to an external device.

12. The combined utility meter and meter register assembly of claim 1, wherein the meter register device is disposed in a the sealed cavity in the housing, wherein a body of sealing material is used to seal the cavity and wherein an information label is placed over the sealing material.

13. The combined utility meter and meter register assembly of claim 1, wherein the means for communicating the metering data signals to an external device includes a transmitter and an antenna for communicating metering data signals wirelessly to an external device.

14. The combined utility meter and meter register assembly of claim 1, wherein the cavity in which the meter register device is disposed is sealed using a sealing material.

15. A combined utility meter and meter register assembly, comprising:
   a common housing for both a utility metering element and a meter register, the housing enclosing a chamber;
   a flow metering element disposed in the chamber;
   wherein the housing has an inlet and an outlet through which a liquid flows into and out of the chamber, respectively; and
   wherein the common housing has a body that forms a cavity disposed above and separated from the chamber and the liquid therein by a wall of plastic material;
   wherein a meter register device is disposed in said cavity, and is responsive to movement of the flow metering element in response to flow of a liquid through the chamber, and is further operable to transmit metering data signals indicative of units of consumption of a utility;
   wherein the cavity is closed by a closure; and
   wherein there is no visual indicator of metering data included within the combined utility meter and meter register assembly.

16. The combined utility meter and meter register assembly of claim 15, wherein the closure is a cover member.

17. The combined utility meter and meter register assembly of claim 15, wherein the closure is a body of sealing material.

18. The combined utility meter and meter register assembly of claim 15, having a data port for communicating metering data signals from the meter register components to a transmitter.

19. The combined utility meter and meter register assembly of claim 15, wherein the meter register device further comprises a transmitter and an antenna for communicating metering data signals wirelessly to an external device.

20. The combined utility meter and register assembly of claim 15, wherein the body is a one-piece integrally formed body of plastic material.

* * * * *

UNITED STATES PATENT AND TRADEMARK OFFICE
CERTIFICATE OF CORRECTION

PATENT NO. : 7,412,882 B2
APPLICATION NO. : 11/353773
DATED : August 19, 2008
INVENTOR(S) : Lazar et al.

Page 1 of 1

It is certified that error appears in the above-identified patent and that said Letters Patent is hereby corrected as shown below:

Claim 12, Col. 5, line 27, between "in" and "the", delete "a".

Signed and Sealed this
Tenth Day of May, 2011

David J. Kappos
*Director of the United States Patent and Trademark Office*